United States Patent
Jägenstedt et al.

(10) Patent No.: US 8,838,291 B2
(45) Date of Patent: Sep. 16, 2014

(54) COMMUNICATION AND SAFETY DEVICE FOR BOUNDARY AIDED SYSTEMS

(75) Inventors: Patrik Jägenstedt, Tenhult (SE); Olle Markusson, Bankeryd (SE)

(73) Assignee: Husqvarna AB, Huskvarna (SE)

(*) Notice: Subject to any disclaimer, the term of this patent is extended or adjusted under 35 U.S.C. 154(b) by 0 days.

(21) Appl. No.: 13/808,336

(22) PCT Filed: Jul. 7, 2010

(86) PCT No.: PCT/SE2010/050792
§ 371 (c)(1),
(2), (4) Date: Jan. 4, 2013

(87) PCT Pub. No.: WO2012/005642
PCT Pub. Date: Jan. 12, 2012

(65) Prior Publication Data
US 2013/0110322 A1  May 2, 2013

(51) Int. Cl.
*G05D 1/00* (2006.01)
*G05D 1/02* (2006.01)
*A01B 79/00* (2006.01)
*A01D 34/00* (2006.01)

(52) U.S. Cl.
CPC ............ *A01D 34/008* (2013.01); *G05D 1/0265* (2013.01); *A01B 79/005* (2013.01); *G05D 2201/0208* (2013.01)
USPC ............................................. 701/2; 701/23

(58) Field of Classification Search
CPC ............ A01D 34/008; A01D 2101/00; G05D 1/0225; G05D 1/0265; G05D 2201/0208; G05D 1/0274; G05D 1/0276; B25J 9/0003
USPC ........................................................ 701/2, 23
See application file for complete search history.

(56) References Cited

U.S. PATENT DOCUMENTS 3,800,902 A    4/1974  Keller
2002/0156556 A1  10/2002  Ruffner
(Continued)

FOREIGN PATENT DOCUMENTS

JP          03241407 A    10/1991
WO           0074465 A1   12/2000
WO       2010077198 A1    7/2010

OTHER PUBLICATIONS

International Search Report and Written Opinion of PCT/SE2010/050792 mailed Mar. 7, 2011.
(Continued)

*Primary Examiner* — Hussein A. Elchanti
(74) *Attorney, Agent, or Firm* — Nelson Mullins Riley & Scarborough LLP

(57) ABSTRACT

The present invention relates to a method 400 and a system 100 for controlling a robotic garden tool 202 around a working area 204 in a boundary wire aided system. The system includes the robotic garden tool 202 to perform an operation within the working area 204, which is at least partly defined by a boundary. The boundary separates the working area 204 from a non-working area. The robotic garden tool also includes detecting means for detecting the boundary. Further, the robotic garden tool 202 is adapted to receive a status signal 110 sent from a signal source and the robotic garden tool 202 is configured to stop the operation, when the status signal 110 provides a stopping signal.

20 Claims, 5 Drawing Sheets

(56) References Cited

U.S. PATENT DOCUMENTS

| | | |
|---|---|---|
| 2005/0007057 A1* | 1/2005 | Peless et al. .................. 318/580 |
| 2007/0142964 A1 | 6/2007 | Abramson |
| 2008/0039974 A1 | 2/2008 | Sandin et al. |
| 2008/0109126 A1* | 5/2008 | Sandin et al. ................... 701/23 |
| 2008/0183349 A1* | 7/2008 | Abramson et al. .............. 701/23 |
| 2009/0315501 A1 | 12/2009 | Li et al. |
| 2011/0190931 A1* | 8/2011 | Anderson et al. ............. 700/253 |
| 2012/0226381 A1* | 9/2012 | Abramson et al. ............ 700/255 |
| 2013/0066484 A1* | 3/2013 | Markusson et al. ............. 701/2 |

OTHER PUBLICATIONS

Chapter I International Preliminary Report on Patentability of PCT/SE2010/050792 mailed Jan. 8, 2013.

Review—Lawnbott LB3500, printed from http://hometoys.com/ezine/08.04/lawnbott/lb3500.htm, published Apr. 2008; retrieved on Apr. 1, 2013.

* cited by examiner

COMMUNICATION AND SAFETY DEVICE FOR BOUNDARY AIDED SYSTEMS

TECHNICAL FIELD

The present invention relates to a robotic garden tool. In particular, the present invention relates to a method and a system for controlling the robotic garden tool when operating in a working area.

BACKGROUND

The robotic garden tools, such as, but not limited to robotic lawnmowers are widely used for grass cutting applications in a lawn. As these robotic garden tools are autonomous, there is a need that they should have knowledge of the lawn area to be cut along with its boundaries. If the robotic garden tool does not have information regarding the boundaries, it may go beyond the cutting area of the lawn or even may cut undesired areas inside the lawn, like a flower bed.

U.S. Application No. 20070142964 published on Jun. 21, 2007, titled "Robot docking station and robot for use therewith" describes charging apparatus for robot and method for reaching the charging apparatus. Here, the area inside which the mowing operation is being performed is delimited by a boundary wire. Whenever the robotic garden tool needs to replenish its battery supplies it detects the boundary wire and depending on the strength of the signal it comes to know its actual location with respect to the wire. Further, on reaching the wire it follows the wire until the charging apparatus is reached. But a problem with such systems is that the signal from the wire has to be sensed continuously by the robotic garden tool. Hence, the above mentioned system needs a very high power generator for generating the magnetic fields which can be detected from all points inside the working area. Also, the receiver on the robotic garden tool needs to be very sensitive, increasing its cost. Further, in the areas around ferromagnetic materials, the strength of the magnetic field may be reduced or even may get attenuated completely. In such cases the robotic garden tool may stop the operation.

Further, to avoid problems associated with boundary wire, grass sensors may be used. In such systems, the robotic garden tool may operate only on detection that grass surface is beneath the robotic garden tool.

U.S. Application No. 20080039974 published on Feb. 14, 2008 and assigned to iRobot Corporation, titled "Robot Confinement" describes a technique for automated boundary and cutting surface detection. Here, the robotic garden tool detects the grass surface for performing the mowing operation. Here, it also differentiates the actual cutting area form non-cutting grass areas such as flower beds and adjacent grass surfaces by boundary delimiting means. But, if these delimiting means fails, the mower may then fail to distinguish between these areas and may damage these non-cutting areas.

In light of the foregoing, there is a need for an improved method for robotic garden tool for detecting the boundary of the working area and also for differentiating the working and non-working areas inside the lawn area, which can overcome the disadvantages of requirement of high power transmitting signal, complex integration, and difficulty in disambiguation between the working and non-working areas. Further, there also exists a need for providing the robotic garden tool information of its complete working environment, for operating it more efficiently.

SUMMARY

In view of the above, it is an objective to solve or at least reduce the problems discussed above. In particular, an objective is to provide a method and a system for controlling the robotic garden tool inside the working area effectively.

Claim 1 provides a novel system for a robotic garden tool to perform an operation in a working area. Further, the working area is at least partly defined by a boundary, which separates the working area from a non-working area. The robotic garden tool is adapted to detect said boundary. Said robotic garden tool is adapted to receive a status signal from a signal source and is further configured to stop operating when the status signal provides a stopping signal. The advantage of the system is that the robotic garden tool may not need to detect the boundary at all times during the operation, reducing the sensitivity requirements for the robotic garden tool in detecting the boundary. The system may further become less sensitive to disturbances and the robotic garden tool may operate in a secure way, without the risk of escaping outside the working area.

According to claim 2, the boundary may be defined at least partly by a boundary wire adapted to conduct an electric boundary signal. Further, said robotic garden tool may include corresponding detection means for detecting said boundary signal.

According to claim 3, the status signal may provide the stopping signal as a response to the boundary signal from the boundary wire being discontinued. This may be useful in cases where due to any reasons the boundary wire has stopped generating the boundary signal and hence the robotic garden tool may not know the boundary of the working area and move outside the working area. Providing the stopping signal may avoid this condition since the robotic garden tool may stop operating before it may pass the boundary wire due to the stopping signal from the signal source.

According to claim 4, the status signal may be adapted to be discontinued if the boundary signal from the boundary wire is discontinued. In a way of indicating to the robotic garden tool that the boundary signal is discontinued, the status signal may be discontinued.

According to claim 5, the signal source may be separated from the boundary. The signal source providing the status signal may then be a separate unit from the boundary. This may provide the possibility of the status signal providing information about the boundary to the robotic garden tool.

According to claim 6, the operation of the robotic garden tool may be adapted to be stopped if the receiving of the status signal is discontinued. This may be useful in the cases where the robotic garden tool may have moved beyond the working area and it may need to be stopped from straying further away from the working area and also causing damages beyond the working area.

According to claim 7, the robotic garden tool may be adapted to stop operating when the status signal is discontinued. Thereby, the robotic garden tool may stop operating if there is a failure in the signal source, or if any other situation occurs that provides a need for the robotic garden tool to stop operating. The stopping signal to the robotic garden tool may then be provided by the status signal being discontinued. Further, the status signal may be discontinued by another reason, such as by manual termination by a user or due to certain weather conditions.

According to claims 8, the signal source may also provide operating instructions to the robotic garden tool along with the status signal. The status signal may be any instructions like changing the cutting height of the grass, commanding the robotic garden tool to return to a charging station or to stop operating for any reason.

According to claim 9, the system may further comprise a charging station, and wherein the signal source may be located at the charging station.

According to claims 10 and 11, said boundary may be defined at least partly by surface changes. Further, the robotic garden tool may include a surface detecting means which may be adapted to detect the surface changes. In parts of the working area, the robotic garden tool may detect surface changes to detect the boundary of the working area. If the robotic garden tool fails to detect a surface change and continues beyond the boundary, the robotic garden tool may stop operating when the status signal is lost due to a too far distance to the signal source.

According to claim 12, the robotic garden tool may calculate the distance to the signal source based on the signal strength of the detected status signal. This system may be useful for stopping the robotic garden tool if the signal strength of the detected status signal is below a predetermined limit indicating the robotic garden tool has gone out of the working area. Further, this may also be helpful in finding the path to the charging station if the signal source is located at the charging station.

According to claim 13, the robotic garden tool is adapted to recognize an identity signal sent from the signal source, such that the robotic garden tool and the signal source are connected to each other to form a system unit. In cases where more than one such system is implemented in near vicinity, the identity signal may help in binding the robotic garden tool only to its own signal source. If the signal source is located at a charging station, the identity signal may help in binding the robotic garden tool to a specific charging station. The identity signal may be provided with a serial number, a pin code or similar in order to be unique for a certain signal source. The robotic garden tool may be adapted only to recognize the identity signal from its own signal source.

According to claim 14, the robotic garden tool may be a robotic lawnmower.

Claim 15 provides a novel method for controlling a robotic garden tool operating within a working area. Further, the working area is at least partly defined by a boundary and the robotic garden tool is adapted to detect said boundary. The method includes the step of receiving a status signal from a signal source when the robotic garden tool is operating within the working area. Further, the method comprises the step of stopping the operation of the robotic garden tool as a response to the status signal providing a stopping signal. The advantage of the method is that the robotic garden tool may not need to detect the boundary at all times during the operation, reducing the sensitivity requirements for the robotic garden tool in detecting the boundary. The system may further become less sensitive to disturbances and the robotic garden tool may operate in a secure way, without the risk of escaping outside the working area.

According to claim 16, the boundary may at least partly be defined by a boundary wire which may be adapted to conduct an electric boundary signal. The robotic garden tool may further comprise at least one detecting means adapted to detect said boundary signal.

According to claims 17 and 18, the boundary may further be defined at least partly by the surface changes and the robotic garden tool may comprise a surface detecting means adapted to detect said surface changes.

According to claims 19 and 20, the method may further comprise the step of detecting that the boundary signal is discontinued, and wherein the stopping signal may be provided as a response to the detection of the boundary signal being discontinued. This restricts the robotic garden tool from moving out of the working area in case the boundary wire is not able to define the boundary of the working area. The boundary signal may be discontinued for a number of reasons, such as a boundary wire breakage or power interruption to the boundary wire. Such reasons may be detected such that the status signal may provide a stopping signal in order to stop the robotic garden tool.

According to claims 21 and 22, the step of providing the status signal with the stopping signal may include discontinuing the status signal. Further, on detection of discontinuity of the status signal, the robotic garden tool may stop its operation. Thereby, the status signal providing a stopping signal may be provided as a discontinuation of the status signal.

According to claim 23, the signal source also may provide operating instructions to the robotic garden tool along with the status signal. The operating instructions may be any instructions like changing the cutting height of the grass, commanding the robotic garden tool to return to a charging station, or to stop operating for any reason.

According to claim 24, the robotic garden tool may be adapted to recognize an identity signal sent out by the signal source, such that the robotic garden tool and the signal source are connected to each other to form a system unit. This identity signal helps the robotic garden tool to identify a particular signal source, if a plurality of signal sources is present in the vicinity. If the signal source is located at a charging station, the identity signal may help in binding the robotic garden tool to a specific charging station. The identity signal may be provided with a serial number, a pin code or similar in order to be unique for a certain signal source. The robotic garden tool may be adapted only to recognize the identity signal from its own signal source.

According to claim 25, the robotic garden tool may be a robotic lawn mower.

BRIEF DESCRIPTION OF THE DRAWINGS

The invention will in the following be described in more detail with reference to the enclosed drawings, wherein.

DESCRIPTION OF EMBODIMENTS

Figure 1:
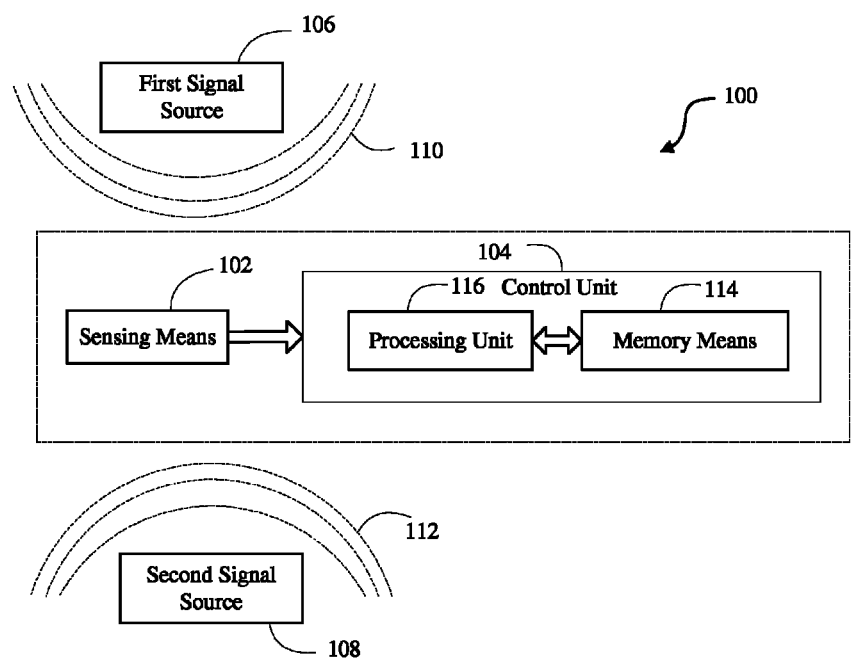
FIG. 1 illustrates a block diagram of a system for controlling a robotic garden tool in a boundary aided system, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

For example, one or more aspects of the present invention can be utilized in other embodiments and even other types of devices. In the drawings, like numbers refer to like elements.

FIG. 1 illustrates a block diagram of a system 100, according to an embodiment of the present invention. The system 100 may be embodied in a battery powered robotic garden tool for controlling the robotic garden tool within a working area. In an embodiment of the present invention, the robotic garden tool may be a battery powered robotic lawnmower used in gardening applications. However, the system 100 may also be embodied in any another equipments, for example, but not limited to, a battery powered automated vacuum cleaner or any other autonomous battery powered robotic tool without departing from the scope of the present invention.

As illustrated in FIG. 1, the system 100 includes a sensing means 102 and a control unit 104. During the operation of the robotic garden tool, the sensing means 102 wirelessly detects one or more signals from a first signal source 106 and a second signal source 108. The first signal source 106 is adapted to send a status signal 110 and the second signal source 108 is adapted to send a second signal 112. The second signal source 108 is a boundary wire and the second signal 112 is a magnetic field generated by the boundary wire. The robotic garden tool receives the status signal 110 at all times during the operating period of the robotic garden tool. Further, the control unit 104 also generates a command signal for stopping the operation of the robotic garden tool when the status signal 110 provides a stopping signal.

The sensing means 102 includes one or more sensors, for example, but not limited to, a magnetic field sensor, a RF wave detecting sensor, a current sensor to detect corresponding magnetic field signals, RF waves or electrical current signals from the first signal source 106 and/or the second signal source 108. The sensor can also be a surface detecting sensor. Further, the surface detecting sensor is used for differentiating the lawn area from other areas for example, but not limited to, road tarmac or the like. In an embodiment of the present invention, the sensors may be positioned at a front portion of the robotic garden tool. In another embodiment of the present invention, the sensors may be positioned at any suitable location on the robotic garden tool. As it may be apparent to a person ordinarily skilled in the art, the sensing means 102 converts the detected signals 110 and/or 112 from the first signal source 106 and the second signal source 108 to equivalent electrical signals. Further, the sensing means 102 provides the converted equivalent electric signals to the control unit 104.

The control unit 104 further includes a memory means 114 and a processing unit 116. The memory means 114 may be a Random Access Memory (RAM), Read Only Memory (ROM), flash memory or any suitable storage equipment. The memory means 114 includes various modules for storing operating instructions and other software of the control unit 104. The operating instructions are a set of computer executable instructions for controlling the overall operations of the control unit 104. The memory means 114 also stores a database of parameters required to send a command to the robotic garden tool based on one or more signals received from the sensing means 102. The parameters include geometry of the lawn or field, strength of the detected signals, types of detected signals etc. The one or more parameters from the memory means 114 is communicated to the processing unit 116.

The processing unit 116 performs all the computations required to control the movement of the robotic garden tool around the lawn. The processing unit 116 includes an input/output (I/O) interface (not shown), which is operable for receiving the parameters and the computer executable instructions from the memory means 114. The processing unit 116 also obtains the converted electrical signals from the sensing means 102 through the I/O interface.

The processing unit 116 also includes a computing module (not shown) to generate a command for controlling the robotic garden tool around the working area. The command directs the robotic garden tool to detect the status signal 110 continuously while it is operating. In an embodiment of the present invention, the computing module also generates a command for stopping the operation of the robotic garden tool, which is in response to the stopping signal provided by the status signal 110. In a further embodiment of the present invention, the robotic garden tool is adapted to stop operating if the receiving of the status signal 110 is discontinued. Further, the computing module determines additional parameters, such as, but not limited to, distance of the robotic garden tool from the first signal source 106.

Further, the processing unit 116 invokes a command from the memory means 114 based on the detected signals 110 and/or 112. The computing module included in the processing unit 116 compares the characteristics of the detected signals 110 and/or 112 with the database stored in the memory means 114 and thus, identify the required command to be invoked from the memory means 114.

Figure 2:
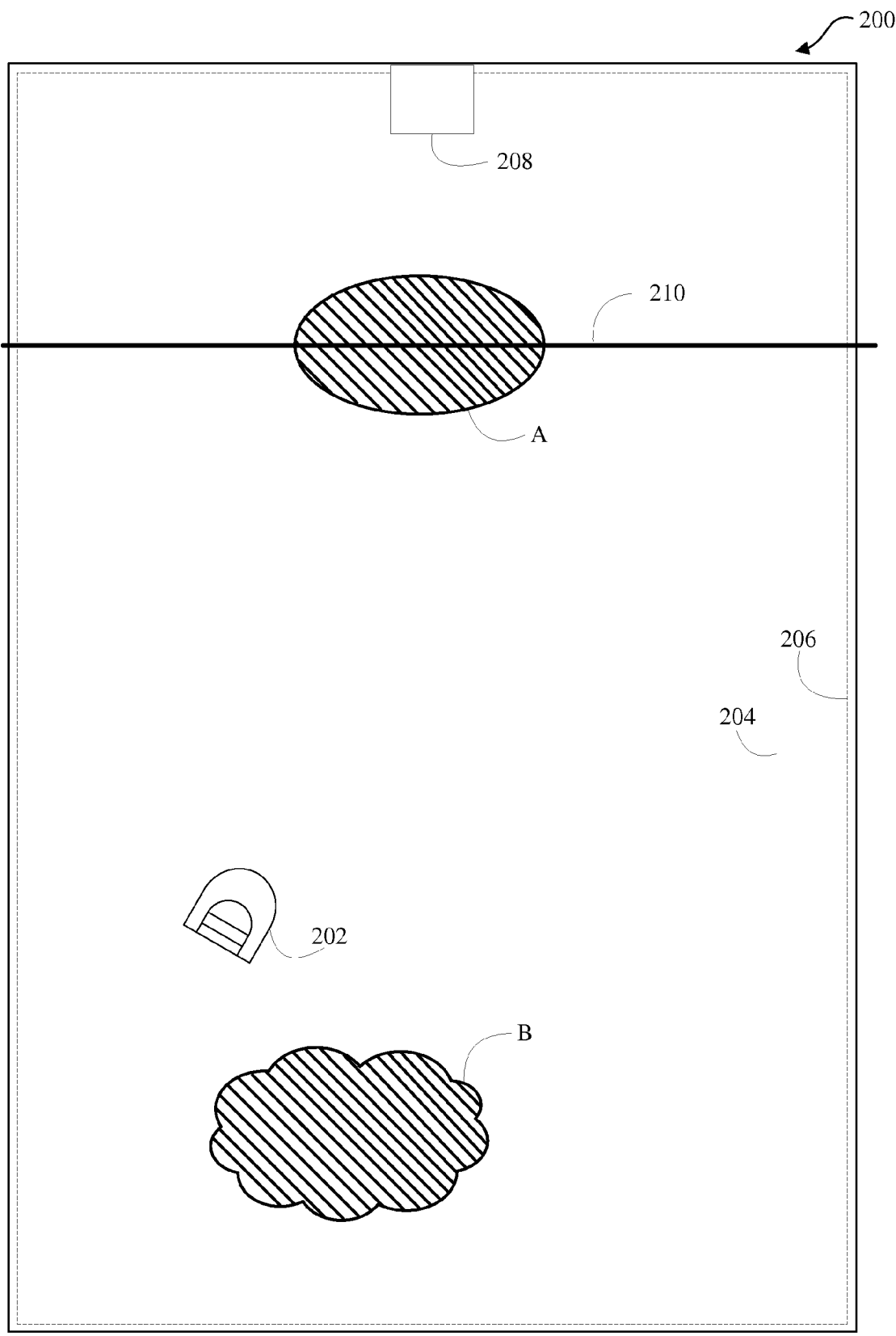
FIG. 2 illustrates a schematic diagram of a control system for the robotic garden tool, according to an embodiment of the present invention.

FIG. 2 illustrates a schematic diagram of a control system 200 for the robotic garden tool 202, according to an embodiment of the present invention. In an embodiment of the present invention, the robotic lawnmower may act as the robotic garden tool 202 and is configured to cut vegetation within the working area 204. The working area 204 may be any terrain with vegetation, such as, but not limited to, lawns, gardens, yards, golf courses, fields, or the like.

In an embodiment of the present invention, the working area 204 may be defined partly by the boundary. The boundary separates the working area 204 from a non-working area. The second signal source 108 is spread across the boundary. The boundary is defined by the boundary wire 206. The boundary wire 206 may be fixed above the ground or embedded under the ground. The boundary wire 206 conducts an electric boundary signal. Further, the boundary wire 206 is connected to a signal generator energized by a power supply or directly connected to the power supply for generating the electric boundary signal.

Further, the electric boundary signal generates the magnetic field around the boundary wire 206. The sensing means 102 includes one or more sensors for detecting the magnetic field. In an exemplary embodiment of the present invention, the strength of the magnetic field is kept low as the robotic garden tool 202 detects the magnetic field only when the robotic garden tool 202 is in near vicinity of the boundary wire 206.

The control system 200 further includes the first signal source 106. The first signal source 106 is located anywhere inside the working area 204. Alternatively, the first signal source 106 may also be located in a suitable position, which may be on the non-working area. The first signal source 106 is located on a charging station 208. Further, the first signal source 106 transmits RF waves. The different types of signals may include, but not limited to, Bluetooth, Zigbee, any other type of standard radio protocol or even may be a signal locally generated on any of the free frequency bands.

The first signal source 106 may also transmit an identifying signal to the robotic garden tool 202 for binding the robotic garden tool 202 with the first signal source 106 to form a system unit. The identifying signal may include, but not limited to, a serial number, PIN, transmitting particular patterns at start of every transmission or the like. This type of arrangement is helpful in cases, where a plurality of such systems is implemented in close vicinity. The identifying signal may be generated by a different source from the first signal source 106 generating the status signal 110. Alternatively, the same source may be used for generation of the identifying signal as the source of the status signal 110. Further, at the robotic garden tool 202, the sensing means 102 may use the same sensor for sensing the status and the identifying signal or may also implement different sensors for identifying the two signals.

The first signal source 106 may be located separately from the boundary. Further, the first signal source 106 is connected to the boundary wire 206 in such a way that, the first signal source 106 is able to detect the conditions of the boundary wire 206. The conditions may be, but not limited to, amount of power passing through the boundary wire 206, no power passing through the boundary wire 206, damage to the boundary wire 206, etc. During the operation of the robotic garden tool 202, the robotic garden tool 202 continuously detects the status signal generated by the first signal source 106. Further, the robotic garden tool 202 does not continually detects the signal form the boundary wire 206 but detects it only when the robotic garden tool 202 is in the close vicinity of the boundary wire 206.

As shown in FIG. 2, magnetic fields are also generated by sources such as a power cable 210. Further, these magnetic fields interferes with the magnetic fields generated by the boundary wire 206 to form regions such as area A, in which the robotic garden tool 202 is not be able to detect the boundary signal, which affects the operation of the robotic garden tool 202. Further, various materials such as ferromagnetic material around the working area 204, may create regions such as area B, in which the magnetic field generated by the boundary wire 206 gets subdued or even attenuated and may not be detected, which again affects the operation of the robotic garden tool 202.

The status signal 110 is used to reflect the state of the boundary signal. The status signal 110 provides the stopping signal to the robotic garden tool 202 if the boundary signal is discontinued. This may happen because of, but not limited to, power failure, discontinuity in the boundary wire 206, or the like. In an alternate embodiment of the present invention, the status signal 110 sent by the first signal source 106 is discontinued completely when no boundary signal is present. Further, when the robotic garden tool 202 receives the stopping signal or does not receive the status signal 110, the control unit 104 generates appropriate command signals for stopping the operation of the robotic garden tool 202. This prevents the robotic garden tool 202 from moving beyond the working area 204.

Further, the stopping signal is generated even when the status signal 110 is discontinued. This is helpful in the case, if the robotic garden tool 202 has moved beyond the working area 204 or if there may be any problems with the first signal source 106 generating the status signal 110. The status signal 110 may also be used for sending different operating instructions to the robotic garden tool 202. The different operating instructions may either be generated by a user or by the first signal source 106. The operating instructions may include, but not limited to, for varying the grass cutting height, returning to the charging station 208, stopping the operation for reasons other than boundary wire 206 and the like.

Further, the status signal 110 is also used for calculating the distance between the robotic garden tool 202 and the first signal source 106. This is done by the control unit 104 by detecting the strength of the received status signal 110. The control unit 104 generates a command to stop the operation of the robotic garden tool 202, if the strength of the signal falls below a particular level, this indicates that the robotic garden tool 202 is far away from the first signal source 106. Further, if the first signal source 106 is located inside the charging station 208, the robotic garden tool 202 calibrates the battery amount that the robotic garden tool 202 needs to reach the charging station 208. The robotic garden tool 202 may also use the first signal source 106 for finding the shortest path to the charging station 208.

Figure 3:
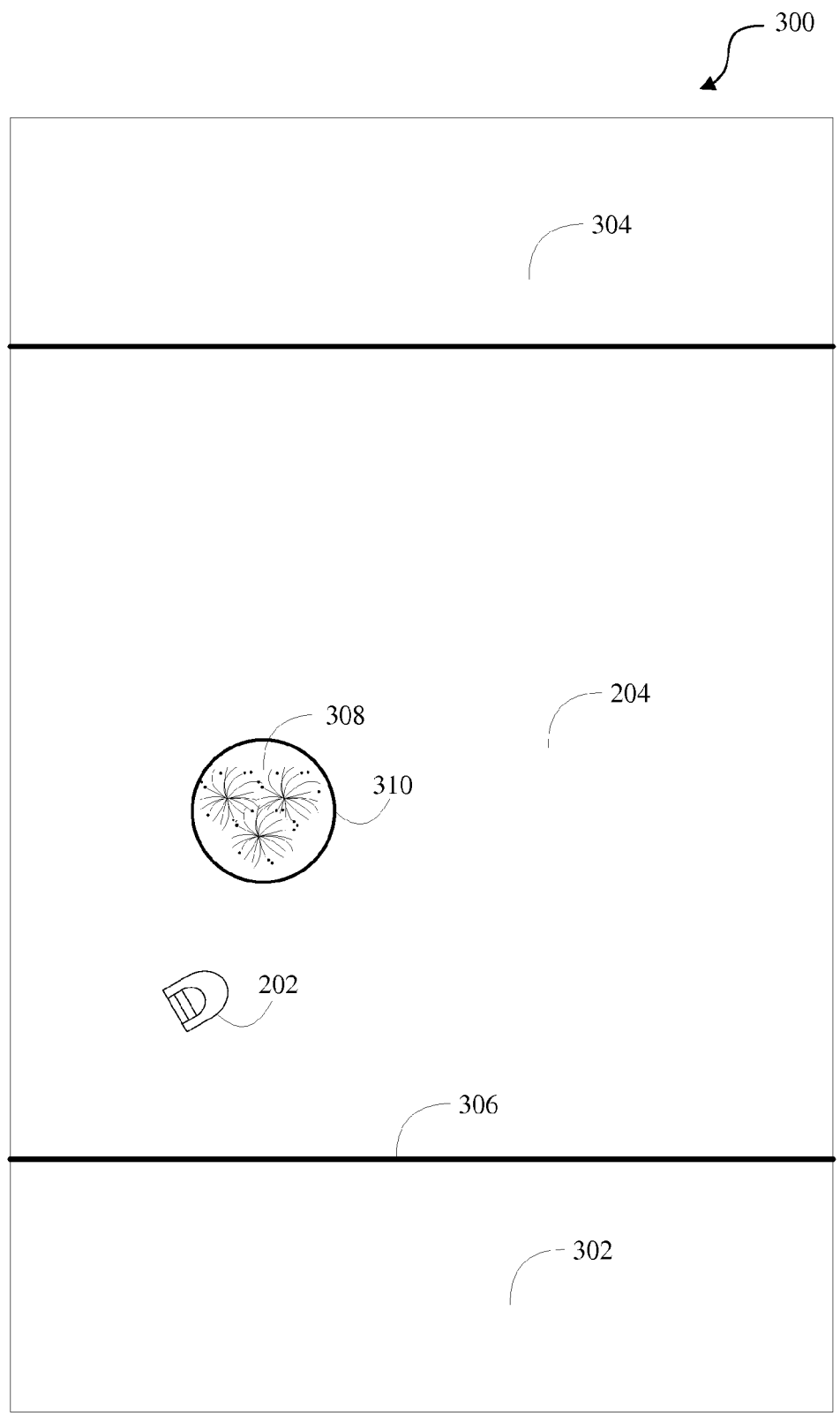
FIG. 3 illustrates a schematic diagram of the control system for the robotic garden tool, according to another embodiment of the present invention.

FIG. 3 illustrates a schematic diagram of the control system 300 for the robotic garden tool 202, according to another embodiment of the present invention. As explained earlier in FIG. 2, the boundaries are defined by the boundary wire 206. In another embodiment of the present invention, the boundary of the working area 204 is defined partly by surface changes. The robotic garden tool 202 may include the surface detecting sensor, for detecting the surface under the robotic garden tool 202. The surface detecting sensor may be, but not limited to, a grass sensor. The surface detecting sensor, included in the sensing means 102, may be adapted to detect the surface changes.

As shown in FIG. 3 the whole area may be divided into three regions, the working area 204, an adjacent lawn 302 and a non-grass surface 304. The non-grass surface 304 may include, but not limited to, road, garage, parking space and the like. Further, the change in the surface between the working area 204 and the non-grass surface 304 is considered partly as the boundary for distinguishing the working area 204 from non-working area. The surface detecting sensor sends appropriate signals to the control unit 104 on detection of change in surface. The control unit 104 further generates appropriate command signals for stopping the robotic garden tool 202 on detection surface changes. Alternatively, the control unit 104 sends command signals for changing the path of the robotic garden tool 202 to avoid the robotic garden tool 202 from going off limits.

Further, in some cases, the surface detecting sensor may not be useful in differentiating the working area 204 with the adjacent lawn 302 area. Thus, a fencing wire 306 is used for defining the boundary between adjacent grass surfaces. Also, the areas inside the working area 204 such as a flower bed 308 can be sensed as working area 204 and hence such areas are surrounded by a protective wire 310.

The first signal source 106 is connected with the fencing wire 306 and the protective wire 310 in such a way that the first signal source 106 detects the condition of both the fencing wire 306 and the protective wire 310. The conditions may include, but not limited to, amount of power passing through the wires 306 and 310, no power passing through the wires 306 and 310, damage to the wires 306 and 310, and the like.

During the operation of the robotic garden tool 202, it continuously detects the status signals generated by the first signal source 106 and does not detect the signals from wires 306 and 310 at all times. Further, the robotic garden tool 202 detects the signals from wires 306 and 310 only when the robotic garden tool 202 is in a close vicinity of the wires 306 and 310.

The status signal 110 is also used to reflect the state of the signals in wires 306 and 310. In an embodiment of the present invention, the status signal 110 provides the stopping signal to the robotic garden tool 202 if the signals in wires 306 and 310 are discontinued. This may be because of power failure, discontinuity in the wires 306 and 310, etc. In an alternate embodiment, the status signal 110 sent by the first signal source 106 is discontinued completely when signals in wires 306 and 310 are absent. Further, when the robotic garden tool 202 receives the stopping signal or does not receive the status signal 110, the control unit 104 generates appropriate command signals for stopping the operation of the robotic garden tool 202.

The further operation of the system 300 including, calculating distance between the robotic garden tool 202 and the first signal source 106 and use of the identifying signal may remain same as explained in conjunction with FIG. 2.

Figure 4:
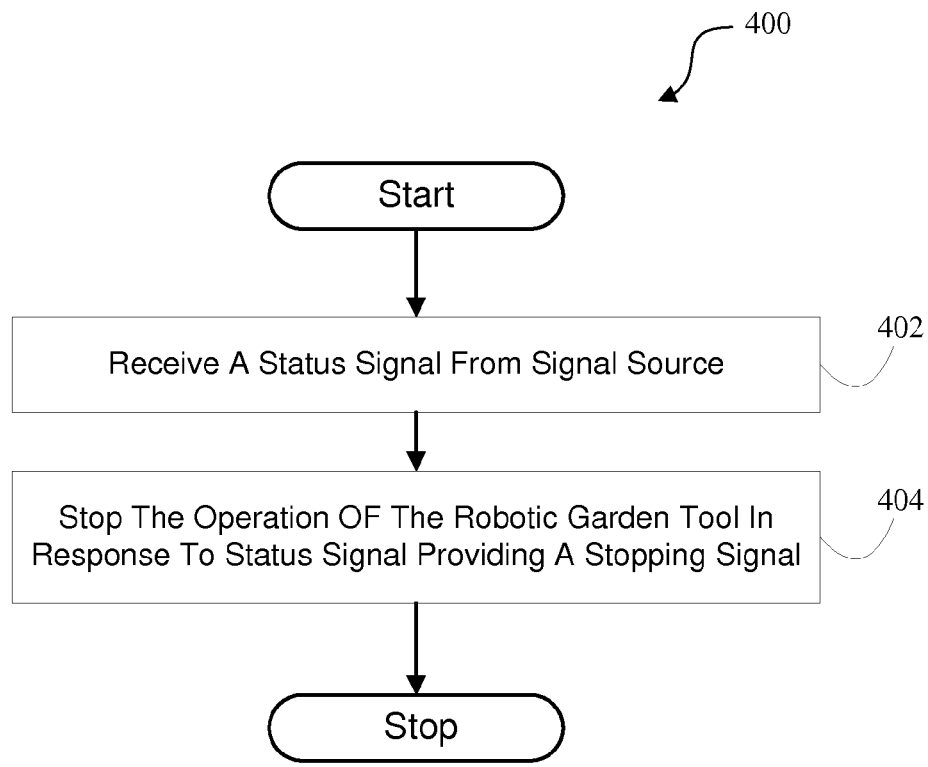
FIG. 4 illustrates a flow chart of an exemplary method for controlling the robotic garden tool in the boundary aided system, according to an embodiment of the present invention.

FIG. 4 illustrates a flow chart of an exemplary method 400 for controlling the robotic garden tool 202 in a boundary aided system, according to an embodiment of the present invention. As explained in earlier FIGS., the robotic garden tool 202 operates within the working area 204, in which difference between the working area 204 and the non-working area is partly defined by the boundary. In various other embodiments of the present invention, the boundary may be defined at least partly by the boundary wire 206 and/or at least partly by surface changes. The system also includes the first signal source 106 for generating the status signals. The boundary wire 206 conducts the electric boundary signal which in turn generates the magnetic field. The robotic garden tool 202 further includes sensing means 102 for detecting the said boundary. Further, the sensing means 102 includes sensors for detecting the boundary signal and surface changes. In an embodiment of the present invention, the robotic garden tool 202 may be the robotic lawn mower.

In step 402, the robotic garden tool 202 detects the status signal 110 from the first signal source 106, while operating within the working area 204. The status signal 110 includes operating instructions, generated either by the user or by the first signal source 106. The operating instructions may include, but not limited to, for varying the grass cutting height, returning to the charging station 208, stopping the operation for reasons other than boundary wire 206 and the like.

Further, the first signal source 106 may also generate an identifying signal such as, but not limited to, serial number, PIN, transmitting particular patterns at start of every transmission and the like, along with the status signal 110. The identifying signal is used for binding the robotic garden tool 202 with the first signal source 106 to form a system unit.

Further, in step 404, when the status signal 110 provides the stopping signal, the control unit 104 stops the operation of the robotic garden tool 202. The stopping signal may be provided when the boundary signal is discontinued. The boundary signal may be discontinued due to reasons such as, but not limited to, power failure, discontinuity in the boundary wire 206, or the like. Further the operation of the robotic garden tool 202 is stopped by the control unit 104 on detecting the stopping signal.

Figure 5:
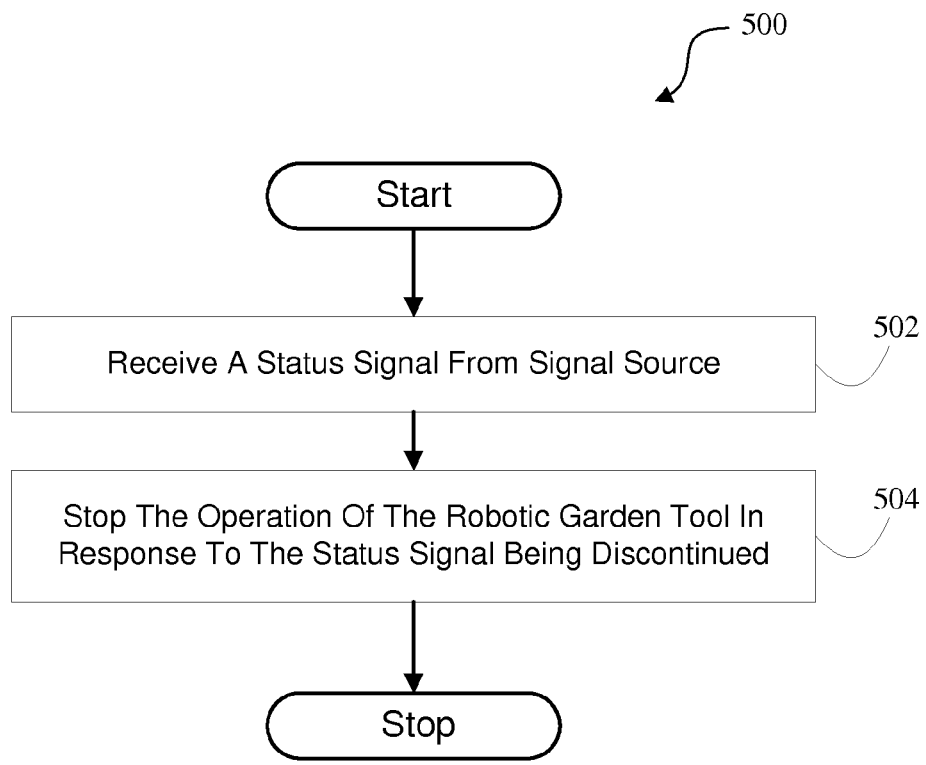
FIG. 5 illustrates a flow chart of another method for controlling the robotic garden tool in the boundary aided system, according to an embodiment of the present invention.

FIG. 5 illustrates a flow chart of another method 500 for controlling the robotic garden tool 202 in a boundary aided system, according to an embodiment of the present invention. In step 502, the robotic garden tool 202 detects the status signal 110 from the first signal source 106, while operating within the working area 204. The status signal 110 may include operating instructions generated either by the user or by the first signal source 106. The operating instructions may include, but not limited to, for varying the grass cutting height, returning to the charging station 208, stopping the operation for reasons other than boundary wire 206 and the like.

Following step 502, in step 504 the operation of the robotic garden tool 202 is stopped in response to the status signal 110 being discontinued. The discontinuity in the status signal 110 may happen because of, but not limited to, power failure, discontinuity in the boundary wire 206, problem with the first signal source 106, robotic garden tool 202 moving outside the working area 204, or the like Though the above mentioned invention explains the working with respect to the robotic garden tool 202, a person skilled in the art may know that such a system may be easily implemented on other tools for example, but not limited to, automated vacuum cleaners or any other autonomous battery powered robotic tool.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A robotic garden tool comprising a control unit configured to control the robotic garden tool such that the robotic garden tool performs an operation in a working area, the working area at least partly being defined by a boundary, the boundary separates the working area from a non-working area, wherein the robotic garden tool is configured to detect the boundary, wherein the robotic garden tool is configured to receive a status signal wirelessly communicated from a signal source, wherein the robotic garden tool is configured to stop operating when the status signal wirelessly communicated from the signal source provides a stopping signal, wherein the signal source that generates the stopping signal is connected to the boundary wire.

2. A robotic garden tool according to claim 1, wherein the boundary is at least partly defined by a boundary wire configured to conduct an electric boundary signal, and wherein the robotic garden tool comprises at least one detecting means configured to detect the boundary signal.

3. A robotic garden tool according to claim 2, wherein the status signal is configured to provide the stopping signal to the robotic garden tool as a response to the boundary signal from the boundary wire being discontinued.

4. A robotic garden tool according to claim 2, wherein the status signal is configured to be discontinued if the boundary signal from the boundary wire is discontinued.

5. A robotic garden tool according to claim 1, wherein the signal source is separated from the boundary.

6. A robotic garden tool according to claim 1, wherein the robotic garden tool is configured to stop operating if the receiving of the status signal is discontinued.

7. A robotic garden tool according to claim 1, wherein the robotic garden tool is configured to stop operating if the status signal is discontinued.

8. A robotic garden tool according to claim 1, wherein the status signal is configured to provide operating instructions to the robotic garden tool.

9. A robotic garden tool according to claim 1, wherein the robotic garden tool further comprises a charging station, and wherein the signal source is located at the charging station.

10. A robotic garden tool according to claim 1, wherein the boundary is at least partly defined by surface changes.

11. A robotic garden tool according to claim 10, wherein the robotic garden tool further comprises a surface detecting means configured to detect said surface changes.

12. A robotic garden tool according to claim 1, wherein the robotic garden tool is configured to calculate the distance to the signal source based on signal strength of the detected status signal.

13. A robotic garden tool according to claim 1, wherein the robotic garden tool is configured to recognize an identity signal sent from the signal source, such that the robotic garden tool and the signal source are connected to each other to form a system unit.

14. A robotic garden tool according to claim 1, wherein the robotic garden tool is a robotic lawnmower.

15. A method of controlling a robotic garden tool operating within a working area, wherein the working area is at least partly defined by a boundary, wherein the robotic garden tool is configured to detect the boundary, the method comprising;
receiving a status signal wirelessly communicated from a signal source during the operation of the robotic garden tool within the working area; and
stopping the operation of the robotic garden tool as a response to the status signal wirelessly communicated from the signal source providing a stopping signal, wherein the signal source that generates the stopping signal is connected to the boundary wire.

16. A method according to claim 15, wherein the boundary is at least partly defined by a boundary wire configured to conduct an electric boundary signal, and wherein the robotic garden tool comprises at least one detecting means configured to detect the boundary signal; or wherein the boundary is at least partly defined by surface changes and wherein the robotic garden tool comprises a surface detecting means configured to detect said surface changes.

17. A method according to claim 16, wherein the method further comprises the step of detecting that the boundary signal is discontinued and wherein the stopping signal is provided as a response to the detection of the boundary signal being discontinued.

18. A method according to claim 15, wherein the step when the status signal provides a stopping signal comprises the step of discontinuing the status signal and wherein the method further comprises the step of stopping the operation of the robotic garden tool as a response to the status signal being discontinued.

19. A method according to claim 15, wherein the status signal further is configured to provide operating instructions for the robotic garden tool and wherein the robotic garden tool is configured to recognize an identity signal sent from the signal source, such that the robotic garden tool and the signal source are connected to each other to form a system unit.

20. A method according to claim 15, wherein the robotic garden tool is a robotic lawn mower.

* * * * *